Patented Oct. 4, 1938

2,131,866

UNITED STATES PATENT OFFICE 2,131,866

WATER INSOLUBLE AZO DYESTUFFS

Werner Zerweck and Karl Schütz, Frankfort-on-the-Main-Fechenheim, Germany, assignors to General Aniline Works, Inc., New York, N. Y., a corporation of Delaware No Drawing. Application March 9, 1935, Serial No. 10,326. In Germany March 17, 1934

4 Claims. (Cl. 260—164)

Our invention relates to water insoluble azo-dyestuffs, more particularly, those of the general formula:

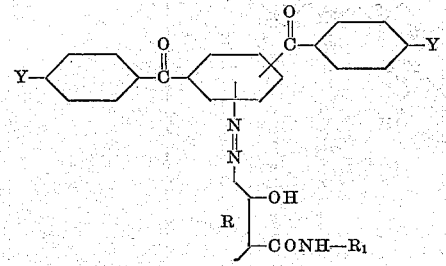

wherein Y stands for a member of the group consisting of hydrogen, methyl and halogen, and

R)
/ stands for a radical of the group consisting of the naphthalene, carbazole and benzo-carbazole series, and $R_1$ stands for a radical of the group consisting of phenyl, substituted phenyl and naphthyl, no water solubilizing group being present in the whole molecule. The new dyestuffs are obtained by combining in substance or on the fiber diazo derivatives of amines which do not contain a water solubilizing group and have the general formula:

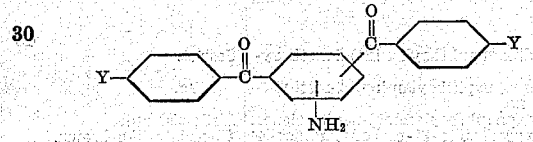

wherein Y has the aforesaid signification, with arylamides of the benzene and naphthalene series of ortho hydroxy carboxylic acids of the naphthalene, carbazole and benzo-carbazole series.

Compared with the analogous dyestuffs obtained by starting from diazo compounds containing only one aroyl group the present dyestuffs are distinguished by better fastness particularly to light, boiling caustic soda solution, and ironing.

The above bases are obtained for instance by condensing according to Friedel-Crafts' reaction nitro-aryl-dicarboxylic acid chlorides with aromatic hydrocarbons which may contain further substituents but no group rendering the product water-soluble, and reducing the condensation product formed.

In order to further illustrate our invention the following examples are given; but we wish it, however, to be understood that our invention is not limited to the particular products or reaction conditions stated therein.

Example 1

50 grs. of well boiled cotton yarn is handled for about half an hour in 1 liter of an impregnating bath (a), squeezed off or centrifuged and dyed in a moist state in the developing bath (b). Then the dyed goods is rinsed, soaped with a boiling soap solution and dried.

(a) Impregnating bath 4 grs. of 1-(2',3'-hydroxynaphtholamino)-4-chloro-2,5-dimethoxybenzene are mixed with 20 ccms. of Turkey red oil of 50% strength and 10 ccms. of a caustic soda solution of 34° Bé., 3.5 ccms. of formaldehyde of 30% strength and the solution thus obtained is made up with water to 1 liter.

(b) Developing bath 1.5 grs. of 1-amino-2,5-dibenzoylbenzene are diazotized in the usual manner, sodium acetate and 30 grs. of sodium chloride are added and the solution thus obtained is made up with water to 1 liter.

The dyestuff thus produced on the fiber of the formula:

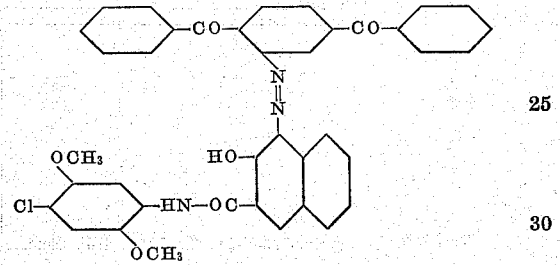

dyes cotton scarlet shades of an excellent fastness to light, chlorine and kier-boiling.

Example 2

30 parts of 1-amino-2,4-dibenzoylbenzene are diazotized and the diazo solution thus obtained is combined with an aqueous suspension of 29.3 parts of 1(2',3'-hydroxynaphthoylamino)-2-methoxybenzene prepared by dissolving the aforesaid quantity of the arylamide in an alcoholic caustic soda solution, diluting with water and adding acetic acid until it has a slightly alkaline reaction. The dyestuff thus obtained of the formula:

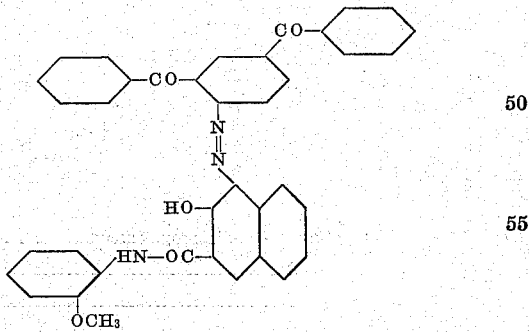

is when dry a scarlet powder which may be used for the production of valuable scarlet color lakes. In the following table a number of further dyestuffs obtainable according to the present invention are described:

| Dyestuff, obtained by the diazo compound of— | Combining with— | Shade of the dyestuff when produced on the fiber— |
|---|---|---|
| 1-amino-2,5-dibenzoylbenzene | 1 (2′,3′-hydroxynaphthoylamino) 2-methoxybenzene. | Yellowish scarlet. |
| Do | 1 (2′,3′-hydroxynaphthoylamino)2, 5-dimethoxybenzene. | Scarlet. |
| Do | 1 (2′,3′-hydroxynaphthoylamino) 2,4-dimethoxy-5-chlorobenzene. | Yellowish red. |
| 1-amino-2, 5-dibenzoylbenzene | p-Anisidide of the 7, 8-benzocarbazole-3′-hydroxy-2′-carboxylic acid of the formula: 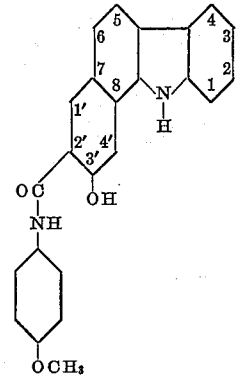 | Dark blackish violet. |
| 1-amino-2, 5-di-p-toluylbenzene | 1 (2′, 3′-hydroxynaphthoylamino) 2-ethoxybenzene. | Yellowish scarlet. |
| Do | 1 (2′, 3′-hydroxynaphthoylamino) 2-methylbenzene. | Do. |
| Do | 1 (2′, 3′-hydroxynaphthoylamino) 2.4-dimethoxy-5-chlorobenzene. | Yellowish red. |
| Do | 1 (2′, 3′-hydroxynaphthoylamino)-naphthalene. | Alizarine like red. |
| Do | 1 (2′-hydroxycarbazole-3′-carbonylamino)-4-chlorobenzene of the formula: 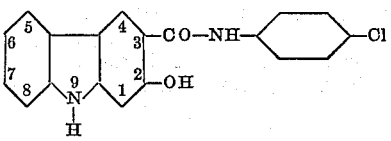 | Chocolate like brown. |
| 1-amino-2, 5-di-(p-chlorobenzoyl)-benzene | 1 (2′, 3′-hydroxynaphthoylamino)-2-methoxybenzene. | Scarlet. |
| Do | 1 (2′, 3′-hydroxynaphthoylamino) 2-methyl-4-chlorobenzene. | Do. |
| Do | 2 (2′, 3′-hydroxynaphthoylamino)-naphthalene. | Yellowish red. |
| Do | 1 (2′-hydroxycarbazole-3′-carbonylamino)-4-chlorobenzene. | Chocolate like brown. |
| 1-amino-3, 5-dibenzoylbenzene | 1 (2′, 3′-hydroxynaphthoylamino)-2-ethoxybenzene. | Yellowish scarlet. |
| Do | 1 (2′, 3′-hydroxynaphthoylamino)-4-methoxybenzene. | Do. |
| Do | 1 (2′-hydroxycarbazole-3′-carbonylamino)-4-chlorobenzene. | Brown. |
| Do | p-Anisidide of 7.8-benzocarbazole-3′-hydroxy-2′-carboxylic acid. | Blackish violet. |
| Do | Terephthaloyl-bis-acetic-acid-2-methoxy-4-chloro-5-methylanilide of the formula: 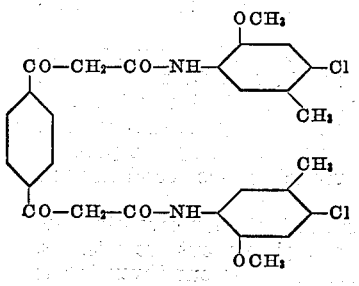 | Greenish yellow. |
| 1-amino-2, 4-dibenzoylbenzene | 1 (2′, 3′-hydroxynaphthoylamino) 2-methylbenzene. | Scarlet. |
| Do | 1 (2′, 3′-hydroxynaphthoylamino) 2-ethoxybenzene. | Do. |
| Do | 1 (2′, 3′-hydroxynaphthoylamino)-2, 4-dimethoxy-5-chlorobenzene. | Yellowish red. |
| Do | 1 (2′, 3′-hydroxynaphthoylamino)-naphthalene. | Red. |

We claim:

1. Water insoluble azo dyestuffs of the general formula:

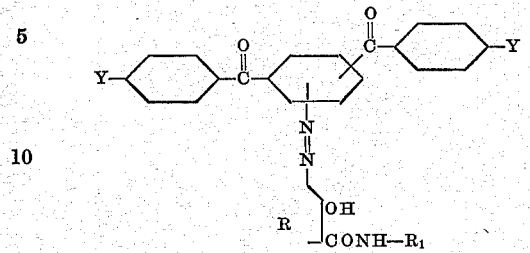

wherein Y stands for a member of the group consisting of hydrogen, methyl and halogen, and

stands for a radical of the group consisting of the naphthalene, carbazole and benzo-carbazole series, and $R_1$ stands for a radical of the group consisting of phenyl, substituted phenyl and naphthyl, no water solubilizing group being present in the whole molecule, which dyestuffs are suitable for the production of valuable color lakes and dye, when produced on the fiber, cotton, valuable shades of a good fastness.

2. A water insoluble azo dyestuff of the formula:

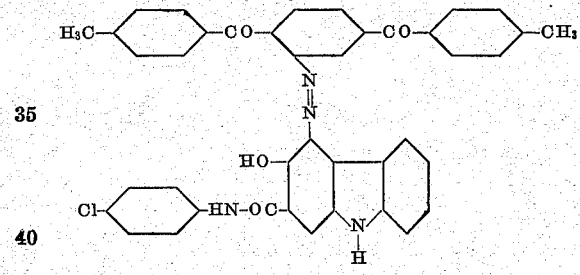

which is when dry a brown powder suitable for the production of valuable brown color lakes and dyes when produced on the fiber cotton very fast chololate like brown shades.

3. A water insoluble azo dyestuff of the formula:

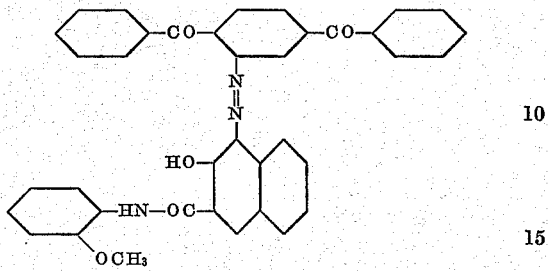

which is when dry a scarlet powder suitable for the production of valuable scarlet color lakes and dyes when produced on the fiber cotton very fast yellowish scarlet shades.

4. A water insoluble azo dyestuff of the formula:

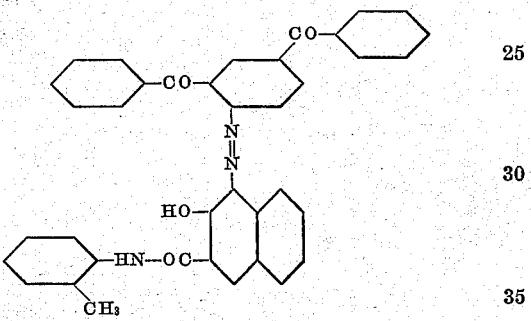

which is when dry a scarlet powder suitable for the production of valuable scarlet color lakes and dyes when produced on the fiber cotton very fast scarlet shades.

WERNER ZERWECK.
KARL SCHÜTZ.